US010919709B2

(12) United States Patent
Mattern et al.

(10) Patent No.: US 10,919,709 B2
(45) Date of Patent: Feb. 16, 2021

(54) APPARATUS FOR THE AUTOMATED REMOVAL OF WORKPIECES ARRANGED IN A BIN

(71) Applicant: Liebherr-Verzahntechnik GmbH, Kempten (DE)

(72) Inventors: Thomas Mattern, Rieden (DE); David Haenschke, Altusried (DE); Bernhard Riedmiller, Wertach (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 321 days.

(21) Appl. No.: 15/876,041

(22) Filed: Jan. 19, 2018

(65) Prior Publication Data

US 2018/0208410 A1    Jul. 26, 2018

(30) Foreign Application Priority Data

Jan. 20, 2017   (DE) .................... 10 2017 000 527.3

(51) Int. Cl.
*B65G 47/90* (2006.01)
*B65G 47/14* (2006.01)
(Continued)

(52) U.S. Cl.
CPC .......... *B65G 47/905* (2013.01); *B25J 9/0084* (2013.01); *B25J 9/0093* (2013.01); *B25J 9/0096* (2013.01);
(Continued)

(58) Field of Classification Search
CPC .. B65G 47/905; B65G 47/1478; B65G 47/80; B65G 47/96; B25J 9/1612; B25J 9/1697;
(Continued)

(56) References Cited

U.S. PATENT DOCUMENTS

| 4,412,293 A | 10/1983 | Kelley et al. |
| 5,314,055 A | 5/1994 | Gordon |

(Continued)

FOREIGN PATENT DOCUMENTS

| DE | 102013013114 A1 | 2/2014 |
| DE | 102012012988 A1 | 4/2014 |

(Continued)

OTHER PUBLICATIONS

Zollitsch, M. et al., "Apparatus for the Automated Removal of Workpieces Arranged in a Bin," U.S. Appl. No. 15/876,012, filed Jan. 19, 2018, 26 pages.

(Continued)

*Primary Examiner* — Michael Collins
(74) *Attorney, Agent, or Firm* — McCoy Russell LLP (57) ABSTRACT

The present disclosure shows an apparatus for the automated removal of workpieces arranged in a bin, said apparatus having a first object recognition device for detecting the workpieces in the bin; a first picker for picking and removing the workpieces from the bin; a controller for evaluating the data of the first object recognition device, for path planning and for controlling the first picker; and a transport device on which the workpieces removed from the bin are placed. Provision is made that a robot arm that is used for placing the workpieces on the transport device is arranged on a pedestal above the transport device.

20 Claims, 6 Drawing Sheets

(51) Int. Cl.
| | | |
|---|---|---|
| *B65G 47/80* | (2006.01) | |
| *B65G 47/96* | (2006.01) | |
| *B25J 9/16* | (2006.01) | |
| *B25J 9/00* | (2006.01) | |
| *B25J 19/02* | (2006.01) | |

(52) U.S. Cl.
CPC ........... *B25J 9/1612* (2013.01); *B25J 9/1664* (2013.01); *B25J 9/1697* (2013.01); *B25J 19/023* (2013.01); *B65G 47/1478* (2013.01); *B65G 47/80* (2013.01); *B65G 47/96* (2013.01); *B65G 2201/02* (2013.01); *Y10S 901/09* (2013.01); *Y10S 901/47* (2013.01)

(58) Field of Classification Search
CPC ...... B25J 9/0084; B25J 9/0096; B25J 9/1664; B25J 9/0093; B25J 19/023; B25J 2201/02; Y10S 901/47; Y10S 901/09
USPC .................................................. 700/213–230
See application file for complete search history.

(56) References Cited

U.S. PATENT DOCUMENTS

| | | | | |
|---|---|---|---|---|
| 6,823,236 | B2 * | 11/2004 | Speckhart | G07F 17/12 |
| | | | | 700/213 |
| 9,002,507 | B2 * | 4/2015 | Mattern | B25J 13/08 |
| | | | | 700/228 |
| 9,289,897 | B2 * | 3/2016 | Mattern | B25J 9/0093 |
| 9,302,396 | B2 * | 4/2016 | Mattern | B25J 13/08 |
| 9,469,035 | B2 | 10/2016 | Noda et al. | |
| 9,492,926 | B2 * | 11/2016 | Mattern | B25J 9/1612 |
| 9,827,676 | B2 | 11/2017 | Mattern et al. | |
| 9,855,659 | B2 | 1/2018 | Mundt et al. | |
| 10,507,989 | B2 * | 12/2019 | Zollitsch | B25J 19/023 |
| 2004/0030442 | A1 * | 2/2004 | Speckhart | G07F 17/12 |
| | | | | 700/213 |
| 2014/0017048 | A1 | 1/2014 | Mattern et al. | |
| 2014/0147240 | A1 | 5/2014 | Noda et al. | |
| 2014/0154036 | A1 * | 6/2014 | Mattern | B25J 9/0084 |
| | | | | 414/729 |
| 2014/0365009 | A1 | 12/2014 | Wettels | |
| 2015/0346708 | A1 | 12/2015 | Mattern et al. | |
| 2015/0352717 | A1 | 12/2015 | Mundt et al. | |
| 2017/0369244 | A1 | 12/2017 | Battles et al. | |

FOREIGN PATENT DOCUMENTS

| | | |
|---|---|---|
| DE | 102012013022 A1 | 4/2014 |
| DE | 102012013023 A1 | 4/2014 |
| DE | 102012013029 A1 | 4/2014 |
| DE | 102012013030 A1 | 4/2014 |
| DE | 102012013031 A1 | 4/2014 |
| DE | 112012002677 T5 | 4/2014 |
| DE | 102014008107 A1 | 12/2015 |
| DE | 102014008108 A1 | 12/2015 |
| DE | 102014008444 A1 | 12/2015 |
| EP | 2578365 A2 | 4/2013 |
| EP | 2679352 A1 | 1/2014 |
| EP | 2698234 A2 | 2/2014 |
| EP | 2876067 A1 | 5/2015 |
| JP | 109239682 A | 9/1997 |
| JP | 2010120141 A | 6/2010 |
| JP | 2011000685 A | 1/2011 |

OTHER PUBLICATIONS

Grieve, T. et al., "3D Force Prediction Using Fingernail Imaging with Automated Calibration," Proceedings of the 2010 IEEE Haptics Symposium, Mar. 25, 2010, Waltham, Massachusetts, 8 pages.
United States Patent and Trademark Office, Office Action Issued in U.S. Appl. No. 15/876,012, dated Jan. 23, 2019, 35 pages.

* cited by examiner

APPARATUS FOR THE AUTOMATED REMOVAL OF WORKPIECES ARRANGED IN A BIN

CROSS REFERENCE TO RELATED APPLICATION

This application claims priority to German Patent Application No. 10 2017 000 527.3, entitled "Apparatus for the Automated Removal of Workpieces Arranged in a Bin," filed Jan. 20, 2017, the entire contents of which is hereby incorporated by reference in its entirety for all purposes.

TECHNICAL FIELD

The present disclosure relates to an apparatus for the automated removal of workpieces arranged in a bin, said apparatus comprising a first object recognition device for detecting the workpieces in the container, a first picker for picking and removing the workpieces from the bin, and a controller for evaluating the data of the first object recognition device, for path planning and for controlling the first picker.

BACKGROUND AND SUMMARY

Such apparatus have become known under the name "random bin picking" and in particular serve the equipping of production plant with workpieces that are supplied in an unordered manner in a bin. Such apparatus are known, for example, from the documents DE102014008444A1, DE102014008108A1, DE102014008107A1, DE102013013114A1, DE102012013031A1, DE102012013030A1, DE102012013029A1, DE102012013023A1, DE102012013022A1 and DE102012012988A1 of the same applicant.

A transport device having one or more end placement areas is typically used for transporting away the workpieces removed from the bin and the workpieces are placed on said end placement areas, for example to transport them to a production plant. A robot arm can be used to place the workpieces on the transport device. It is arranged in the above-named documents either between the bin and the transport device or between a buffering station and the transport device.

It is the object of the present disclosure to further improve the known apparatus for the automated removal of workpieces arranged in a bin.

This object is achieved by an apparatus for the automated removal of workpieces arranged in a bin, comprising a first object recognition device for detecting the workpieces in the bin; a first picker for picking and removing the workpieces from the bin; a controller for evaluating data of the first object recognition device, for path planning and for controlling the first picker; and a transport device on which the workpieces removed from the bin are placed, wherein a robot arm that is used for placing the workpieces on the transport device is arranged on a pedestal above the transport device.

The present disclosure relates to an apparatus for the automated removal of workpieces arranged in a bin, said apparatus comprising a first object recognition device for detecting the workpieces in the bin, a first picker for picking and removing the workpieces from the bin, and a controller for evaluating the data of the first object recognition device, for path planning and for controlling the first picker. The apparatus further has a transport device on which the workpieces removed from the bin are placed. The apparatus in accordance with the present disclosure is characterized in that a robot arm that is used for placing the workpieces on the transport device is arranged on a pedestal above the transport device. A particularly effective utilization of the available construction space hereby results. This arrangement further enables additional functions.

In an example embodiment of the present disclosure, a station for handling the workpieces is provided beneath the pedestal. It can in particular be a station for a manual handling of the workpieces on the transport device. The space to integrate such a station in the apparatus in accordance with the present disclosure is created by the arrangement of the robot arm on the pedestal above the transport device. The station can in particular be utilized to manually correct the position of incorrectly placed workpieces or to manually sort out such workpieces.

The arrangement of the robot arm on the pedestal additionally facilitates the protection of an operator who works at the station for the manual handling of the workpieces since the station is at least partly screened by the pedestal.

The apparatus in accordance with the present disclosure may have a protective enclosure. The protective enclosure serves to delineate the working region of the apparatus to the outside to avoid injuries to operators by the apparatus. The protective enclosure may surround the apparatus on all sides.

In an example embodiment of the present disclosure, the station for handling the workpieces is accessible from outside the protective enclosure during ongoing operation of the apparatus. This also makes possible access to the workpieces placed on the transport device during ongoing operation so that, for example, a manual correction is possible without the apparatus having to be stopped. In a possible embodiment, the station for handling the workpieces can be open to the outside.

In a possible embodiment, the station for handling the workpieces can be arranged outside the working region of all the pickers of the apparatus. The station is already in particular largely screened from the working region of the robot arm by the pedestal and by the arrangement of the robot arm on the pedestal due to the arrangement of the robot arm that is used for placing the workpieces on the transport device on a pedestal above the transport device. Alternatively or additionally, the station can be separated from the working region of the picker by a protective wall that forms part of the protective enclosure.

In an example embodiment of the present disclosure, the transport device has a placement region in which the robot arm places workpieces on the transport device. The placement region may be arranged next to the pedestal, with the transport device extending from the placement region beneath the pedestal and optionally from there further out of out the apparatus. Optionally, the region of the transport device may be arranged beneath the pedestal forms a handling region. The workpieces may first run through the handling region after the placement on the transport device before they are led out of the apparatus.

Alternatively or additionally, the transport device can have a placement region and a handling region, with the handling region being located beneath the pedestal, and the placement region in front of the pedestal, so that the robot arm arranged on the pedestal can place the workpieces on the placement region of the transport device without impediment. The placed down workpieces can then be accessed in the handling region.

The transport device can furthermore be led beneath the pedestal. A region of the transport device that projects at a side beneath the pedestal may form a placement region in which the workpieces are placed on the transport device by the robot arm. The transport device may be led out of the apparatus at the side disposed opposite the placement region, with the workpieces being transported from the placement region to the outside beneath the pedestal. The station in accordance with the present disclosure for handling the workpieces may be arranged beneath the pedestal.

The pedestal can, for example, comprise a plurality of supports which are arranged next to and/or at both sides of the transport device and support a platform on which the robot arm is mounted. The station and/or the transport device can be accessible between two supports in an example embodiment.

One or more processing stations can be arranged at the outlet of the apparatus, for example for laser marking the workpieces, and the transport device runs therethrough. The processing station or processing stations may be connected downstream in the transport direction of the transport device of the station for handling.

The transport belt may have end placement areas at which the workpieces are placed on the transport belt. The end placement areas of the transport device can be nests adapted to the shape of the workpieces in a possible embodiment in which the workpieces can be placed in a position and/or alignment defined by the nests. The nests can optionally also be arranged at pallets that are transported on the transport device. Alternatively, the transport belt can, however, also have simple placement areas. The workpieces can, for example, be placed on the transport device by the robot arm in positions not defined more closely by the configuration of the transport device.

The transport device may comprise one or more transport belts.

In a first variant of the present disclosure, the first picker can be arranged at the robot arm so that the robot arm arranged on the pedestal is used both for picking the workpieces from the bin and for placing the workpieces on the transport device.

In a second variant, in contrast, a second picker is provided that is arranged at the robot arm so that the first picker is used for picking the workpieces from the bin and the second picker is used for placing the workpieces on the transport device. In the second variant, the first picker is optionally arranged at a further robot arm and/or at a surface portal.

In a possible embodiment of the present disclosure, the workpieces can be placed directly on the transport device, starting from the bin. This is in particular advantageous when the first picker is used both for picking the workpieces on the bin and for placing the workpieces on the transport device.

The apparatus in accordance with the present disclosure can furthermore have a buffering station on which the first picker places the workpieces after the removal from the bin, with the robot arm being used to place the workpieces on the transport device, starting from the buffering station.

In a first variant, the first picker can be arranged at the robot arm and can be used both for removing the workpieces from the bin and placing the workpieces on the buffering station and for a repeat picking of the workpieces from the buffering station and for placing them on the transport device.

However, a second variant may be used on the use of a buffering station, in which second variant the first picker places the workpieces on the buffering station after the removal from the bin and a second picker arranged at the robot arm picks up the workpieces from the buffering station and places them on the transport device.

If the first picker is arranged at a further robot arm, the robot arm of the first picker may be arranged beneath the plane of the robot arm raised by the pedestal for placing the workpiece on the transport device. The base of the robot arm of the first picker can be arranged either directly on the floor or on a pedestal that is lower than the pedestal of the robot arm that is used for placing the workpieces on the transport device.

The robot arm or the robot arms may has/have a base a plurality of moving parts which are connected to one another by rotational or pivot mechanisms. The base of the robot arm may be mounted on the pedestal.

A vertical rotational axis may be arranged at the base and supports a first rotatable element of the robot arm. A horizontal pivot axle that supports a first arm segment may be arranged thereat. Further arm segments are in turn arranged thereat via pivot axles and rotational axles. The robot arms used can, for example, be 6-axis industrial robots.

In a possible embodiment of the present disclosure, the picker can be arranged at the robot arm via a picker arm element, with the picker arm element having further axes of movement. The picker arm element can, for example, have an additional pivot axle and/or axle of rotation.

In an example embodiment of the present disclosure, both the first picker and the second picker, if present, are configured as mechanical pickers.

In an example embodiment of the present disclosure, the apparatus can have a second buffering station. The robot arm may be used to pick up the workpieces from the buffering station and to selectively place them on the second buffering station and on the transport device.

A second object recognition device may be provided that determines the orientation of the workpiece on the buffering station, with the controller deciding with reference to the data of the second object recognition device whether a workpiece moves directly to the transport device or first to the second buffering station.

The second buffering station may be a repicking location that permits a picking of the workpiece with a changed orientation relative to the picker.

If a buffering station is used on which the workpieces picked from the bin are placed and picked up again, said buffering station can in particular be configured as described in the following:

The buffering station can comprise a transport device that transports the workpieces from a placement region into a removal region. The placing and the picking back up of the workpieces from the buffering station can hereby be spatially separated. In a particularly advantageous embodiment, the transport device is a turntable.

In a further example embodiment, the buffering station can have at least one tiltable placement area that is tiltable into a slanted position via a tilt mechanism. The tiltable placement area can in particular be tiltable from a substantially horizontal alignment into a slanted position.

The tiltable placement area may be configured such that a workpiece placed on the tiltable placement area slides off the tiltable placement area due to the tilting. The tiltable placement area can hereby in particular be used for isolating and/or expelling workpieces.

In a possible embodiment, the tiltable placement area can be arranged such that a workpiece placed on the tiltable placement area slides onto the transport device by tilting the tiltable placement area. The buffering station may have a sensor that recognizes whether more than one workpiece has been picked, with the controller controlling the first picker when more than one picked workpiece has been detected, such that the workpieces are placed on the tiltable placement area and slide onto the transport device by tilting the placement area. If it is in contrast recognized that only one workpiece has been picked, it may be directly placed on the transport device.

Alternatively or additionally, the tiltable placement area can be arranged at a transport device, with the transport device optionally having a plurality of separately tiltable placement areas. The tiltable placement area can in particular be arranged at a turntable, with the turntable optionally having a plurality of separately tiltable placement areas.

The buffering station can furthermore have an expulsion apparatus that is arranged such that a workpiece placed on a tiltable placement area slides to the expulsion apparatus by tilting the placement area. The expulsion apparatus may be a drawer, with the drawer optionally being able to be operated from outside a protective enclosure of the apparatus.

In a further embodiment, the buffering station can comprise a transport device that transports the workpieces from a placement region into a removal region and a second object recognition device for detecting the workpieces on the transport device, with the second object recognition device having a light source for illuminating the workpiece. A reliable detection of the workpieces on the transport device is hereby possible.

The second object recognition device may have a casing that reduces the incidence of scattered light from outside onto the workpiece, with the casing optionally extending from a sensor that is arranged at a first spacing from a placement area of the transport device to the transport device. A supply and discharge region can remain open between the casing and a placement area and permits the supply and discharge of the workpieces on the placement area of the transport device in the regions of the casing. The casing may end in the supply and discharge region at a second spacing from the placement area of the transport device, with the second spacing amounting to less than 50%, optionally less than 20%, of the first spacing.

In a further embodiment, the buffering station can comprise a turntable that transports the workpieces from a placement region into a removal region and a second object recognition device for detecting the workpieces on the turntable, with the second object recognition device being arranged above the turntable such that a workpiece moves into a detection region on the way from the placement region into the removal region where it is detected by the second object recognition device before it is moved on to the removal region by rotating the turntable.

In a possible embodiment of the present disclosure, the turntable can work in a cycled manner and can have at least three rotational positions, with a placement area of the turntable being arranged in the placement region in the first rotational position of the turntable, in the detection region in a second rotational position, and in the removal region in the third rotational position. The placement of a workpiece on the turntable can take place by the first picker, the detection of a workpiece on the turntable by the second object detection device, and the picking back up of a workpiece from the turntable by the robot arm with a respectively stationary turntable.

Alternatively or additionally, the turntable further can have at least three placement areas, with a second placement area being in the detection region and a third placement area being in the removal region whenever a first placement area is arranged in the placement region. There respectively simultaneously may take place: a placement of a first workpiece on the turntable by the first picker, a detection of a second workpiece on the turntable by the second object recognition device, and a picking back up of a third workpiece from the turntable by the robot arm.

The above-described casing of the second object recognition device may be arranged in the detection region, with the placement areas of the turntable each being able to be moved beneath the casing by rotation of the turntable.

Alternatively or additionally, the tiltable placement area may be arranged and/or arrangeable beneath the casing. An expulsion can hereby take place immediately by tilting the placement area when a defective part and/or an incorrect number of parts and/or caught parts are detected by the second object recognition device.

The whole base surface of the tiltable placement area is further optionally located beneath the casing, with the side walls of the casing optionally enabling a tilting of the placement area within the casing.

The expulsion apparatus may be arranged such that, by tilting a tiltable placement area arranged in the detection region, the workpieces arranged on this placement area slide into the expulsion apparatus. An expulsion can hereby take place immediately by tilting the placement area when a defective part and/or an incorrect number of parts and/or caught parts are detected by the second object recognition device.

The first object recognition device can be a 3D sensor in accordance with the present disclosure. If a second object recognition device is provided, it may comprise a 2D sensor. A 3D sensor can in particular be dispensed with in the second object recognition device in a possible embodiment.

In a possible embodiment of the present disclosure, a plurality of bins with workpieces from which the first picker can pick workpieces can be arranged in the working region of the first picker. For this purpose, the apparatus may comprise a supply arrangement having at least two supply regions arranged next to one another for bins.

The first object recognition device may be moved over each of the bins and/or supply regions by means of a travel arrangement.

Alternatively or additionally, a separation apparatus can be provided via which the supply regions can be individually separated from the working region of the picker. A hood can in particular be provided that can be moved over one of the bins and/or one of the supply regions.

The apparatus in accordance with the present disclosure can be configured such that a plurality of different workpieces can be handled next to one another.

Alternatively or additionally, the transport device can have a plurality of parallel transport paths. Different workpieces are optionally placed on the different transport paths of the transport device.

The present disclosure will now be explained in more detail with reference to embodiments and to drawings.

DETAILED DESCRIPTION

FIGS. 1 to 8B show an embodiment of an apparatus in accordance with the present disclosure in which all the aspects of the present disclosure have been implemented in combination. The implementation of the individual aspects shown in the embodiment can, however, respectively be used independently of the combination shown and therefore also respectively per se forms an independent aspect of the present disclosure.

Figure 1:
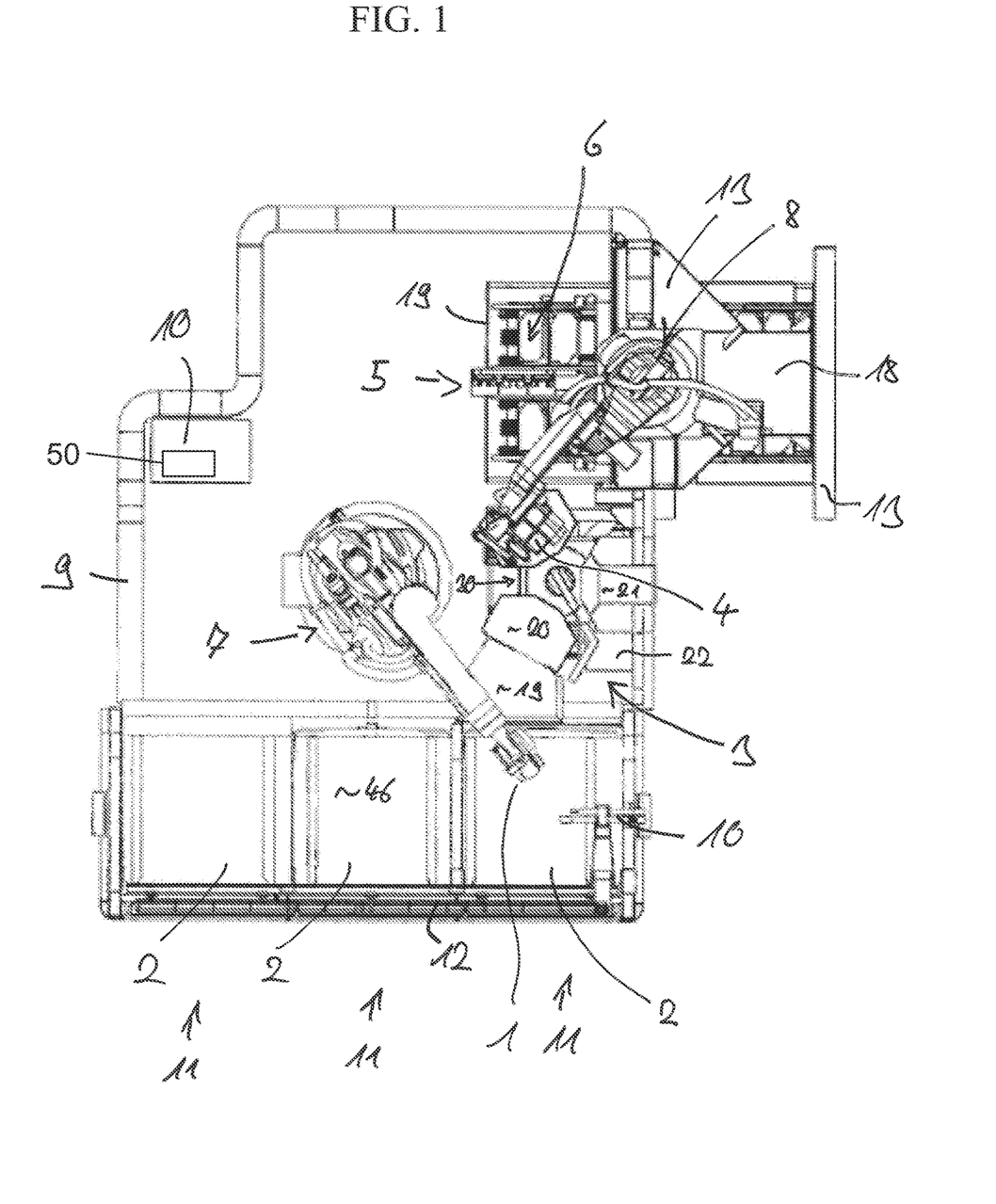
FIG. 1 shows an embodiment of an apparatus in accordance with the present disclosure in a plan view.
Figure 2:
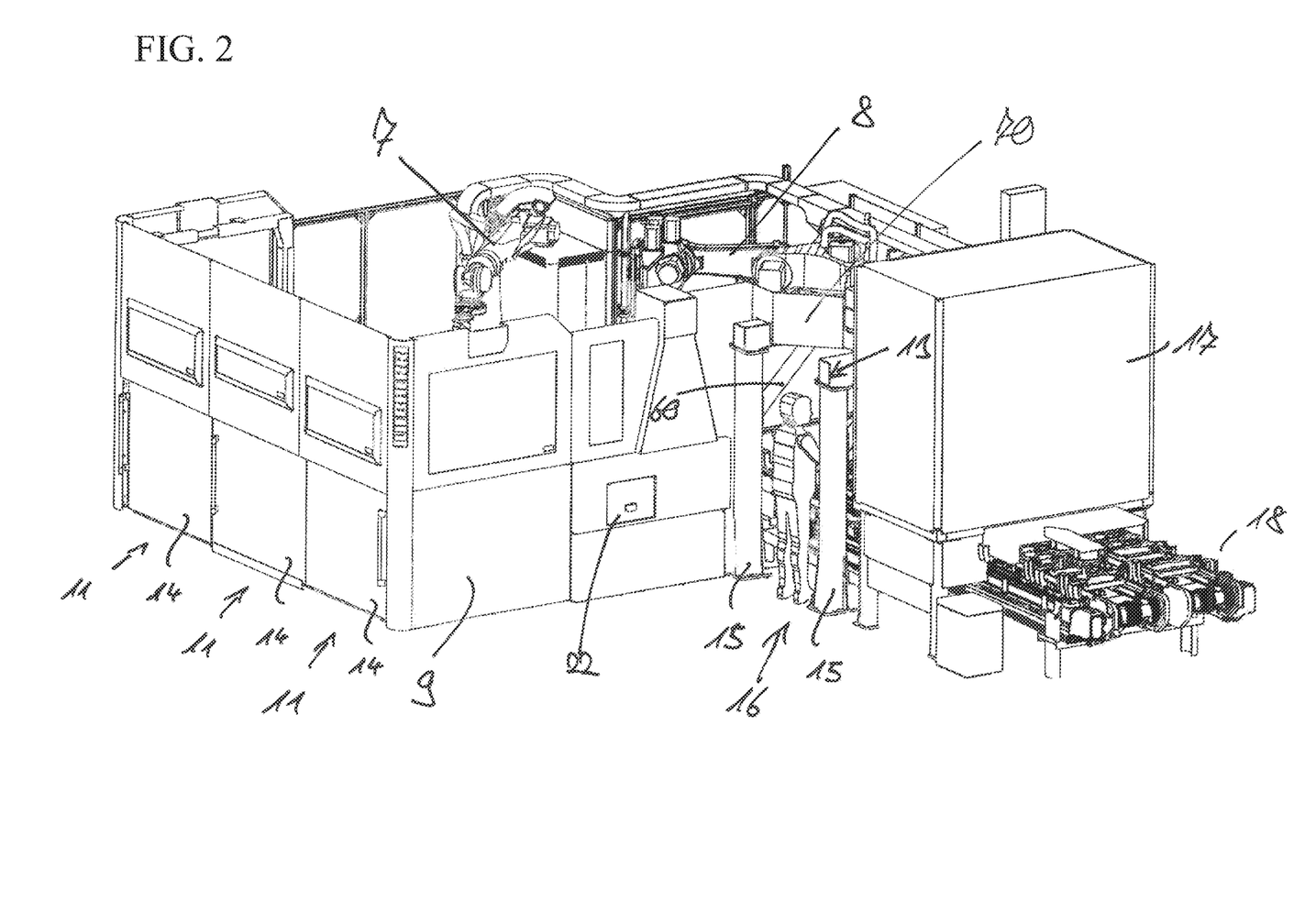
FIG. 2 shows the embodiment of FIG. 1 in a perspective view obliquely from above.
Figure 3:
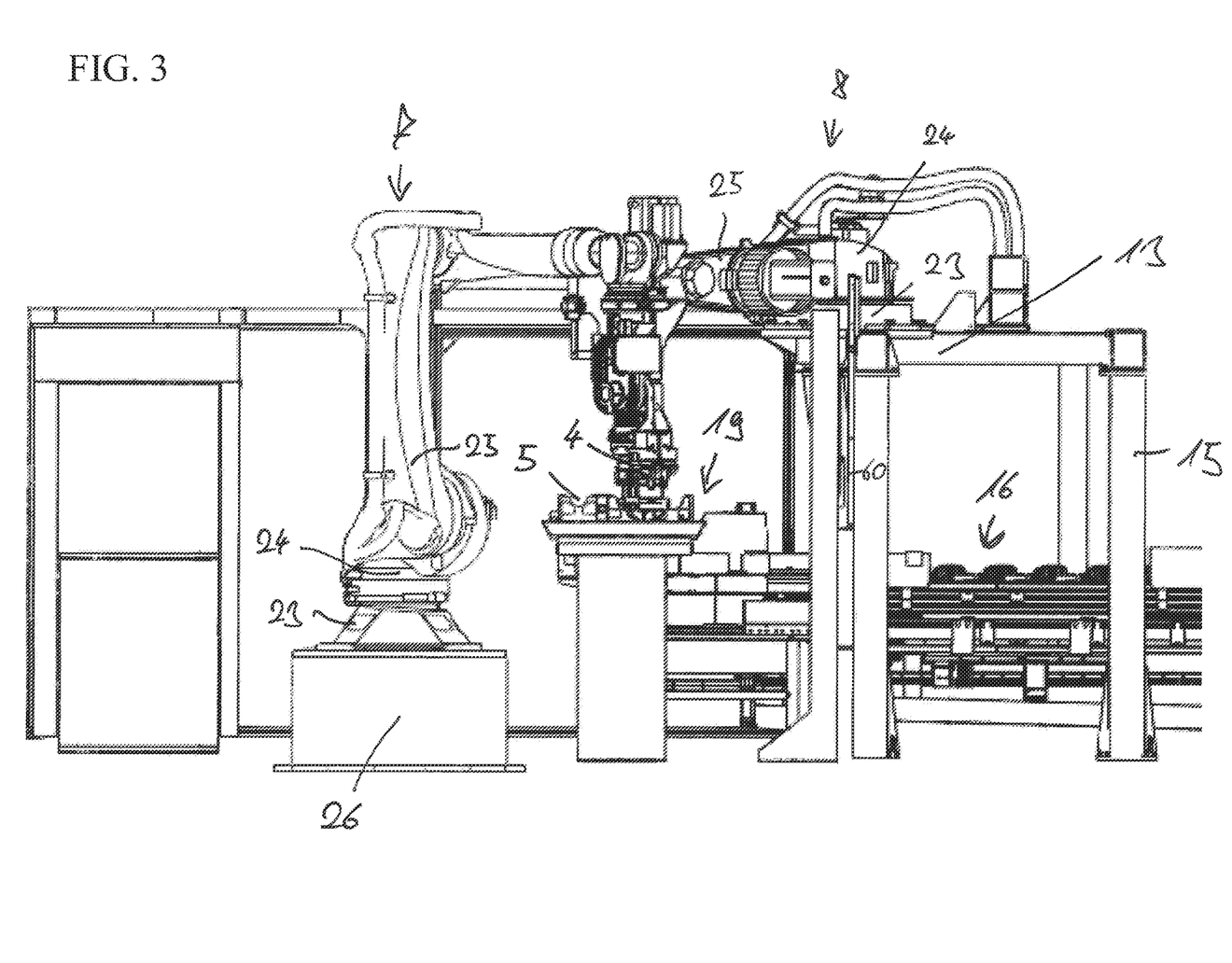
FIG. 3 shows the embodiment of FIG. 1 in a side view in which the protective enclosure has been partly removed.

The embodiment of the apparatus in accordance with the present disclosure shown in FIGS. 1 to 3 has a first picker 1 which is used to pick workpieces from the bins 2. Workpieces can be provided in an ordered or unordered form in the bins 2.

An object recognition device 10 is furthermore provided that detects workpieces present in the bins 2. The apparatus has an electronic controller arranged in a control cabinet 10, with a plurality of actuators or drives communicating with the electronic controller 10 and having instructions stored therein for carrying out the actions described herein based on sensor 50 and other parameters. The controller evaluates the data of the object recognition device 10, that carries out a path planning to control the picker, and that controls the picker using this path planning to remove the workpieces from the bin 2.

In the embodiment shown in FIGS. 1 to 3, the first picker 1 is arranged at a robot arm 7 and is moved by it. The robot arm is in particular a 6-axis industrial robot. Alternatively, the first picker could also be arranged at a surface portal or linear portal and can be moved via it. The first picker 1 may be arranged above a picking arm element at the first robot arm 7 or above the surface portal or linear portal that has one or more further axes of movement to ensure a complete emptying of the bin. The picking arm element can in particular have a pivot axis and an axis of rotation. The picking arm element or the arrangement and embodiment of the first picker 1 can in particular take place such as is known from DE102013013114 A1. The first picker is a mechanical picker in the embodiment.

In the embodiments shown in the Figures, a plurality of bins 2 can be arranged in the working region of the first picker 1. For this purpose, a supply arrangement having three supply regions 11 is provided into which a respective bin can be introduced. As can be recognized in FIG. 2, the protective enclosure 9 of the apparatus has respective doors 14 for this purpose via which the bins can be introduced into and removed from the supply regions. A separation arrangement is furthermore provided in the form of a displaceable hood 46 that can be selectively arranged above one of the three supply regions. The separation arrangement separates the respective supply region from the working region of the picker 1 so that a bin 2 arranged in the separated supply region can be replaced without stopping the operation of the apparatus. Two respective supply regions are open toward the working region of the picker thanks to the use of three supply regions. This makes it possible to empty two bins having different workpieces in parallel, for example.

The object detection unit 10 in the embodiment has a sensor that is movable at a travel arrangement 12 and that can hereby be arranged above each of the bins or supply regions. Only a first object recognition unit 10 is hereby necessary to detect workpieces in each of the bins.

The bins can, for example, be metal boxes or lattice boxes. The apparatus shown in the embodiment can be used with three bins that each comprise identical workpieces or with two or three bins having different workpieces.

The object detection of the workpieces in the bin by the first object recognition device 10, the path planning, and the control of the first picker, as well as the embodiment of the first object recognition device can take place as is known from DE 102012012988 A1. The embodiment and the operation of the supply unit can take place as is known from DE 102014008108 A1.

The apparatus can also have only one or two supply regions and/or only one bin that is arranged in the working region of the first picker.

The apparatus shown in FIGS. 1 to 3 has a first buffering station 3 on which the workpieces removed from one of the bins 2 by the first picker 1 can be placed to be isolated and/or to be picked again with higher precision from there. A positioning apparatus in the form of a second picker 4 is provided that receives the workpieces from the buffering station. The second picker 4 is arranged at a second robot arm 8 in the embodiment. In alternative embodiments, the second picker 4 could also be arranged at a surface portal or linear portal. The second picker is a mechanical picker in the embodiment. Further alternatively, the same picker could be used both for placing the workpieces on the buffering station and for picking the workpieces back up from the buffering station.

The buffering station 3 in the embodiment has a placement region in which the workpieces are placed by the first picker 1 and a removal region which is spatially separate therefrom and in which the workpieces are removed by the second picker 4. A transport device is provided that transports the workpieces on the buffering station from the placement region to the removal region. A second object recognition device 21 is furthermore provided that detects the workpieces on the transport device. In the embodiment, the buffering station has a detection region for this purpose that is spatially separate from the placement region and from the removal region.

The picking back up of the workpieces from the buffering station takes place by a second picker 4 that is arranged at a second robot arm 8. It is used to place workpieces on a transport device 6. The transport device 6 in the embodiment comprises a transport belt on which nests for the workpieces are arranged as end placement areas and the workpieces are placed into said nests. Any other transport devices would, however, also be conceivable here.

Figure 4:
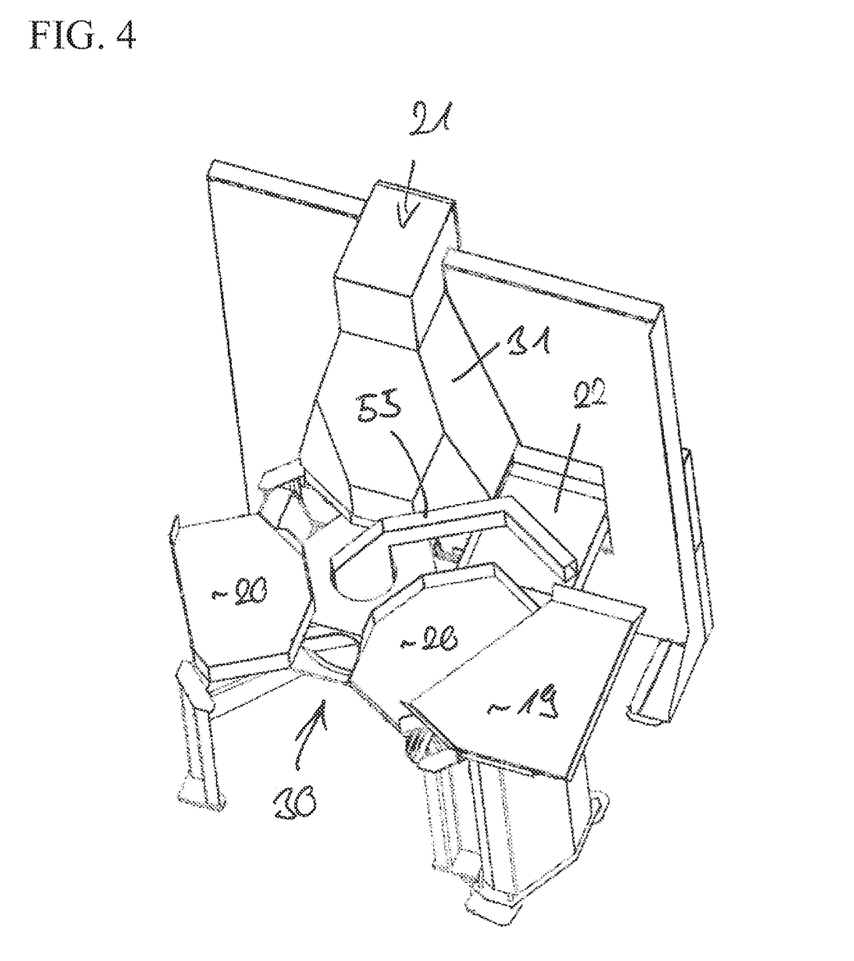
FIG. 4 shows the embodiment of a buffering station used in the embodiment of FIG. 1.
Figure 5:
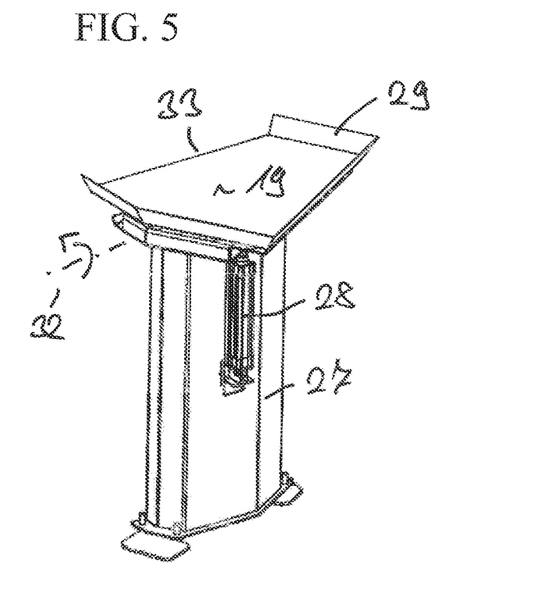
FIG. 5 shows an embodiment of a tiltable placement area such as is used in the embodiment of a buffering station in accordance with FIG. 4.
Figure 6:
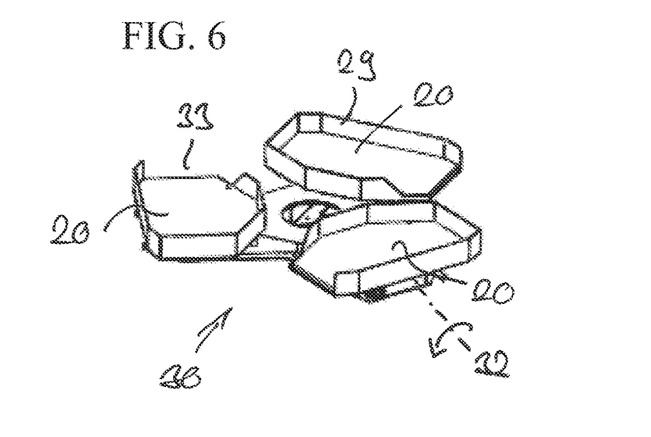
FIG. 6 shows an embodiment of a turntable such as is used in the embodiment of a buffering station shown in FIG. 4.
Figure 7:
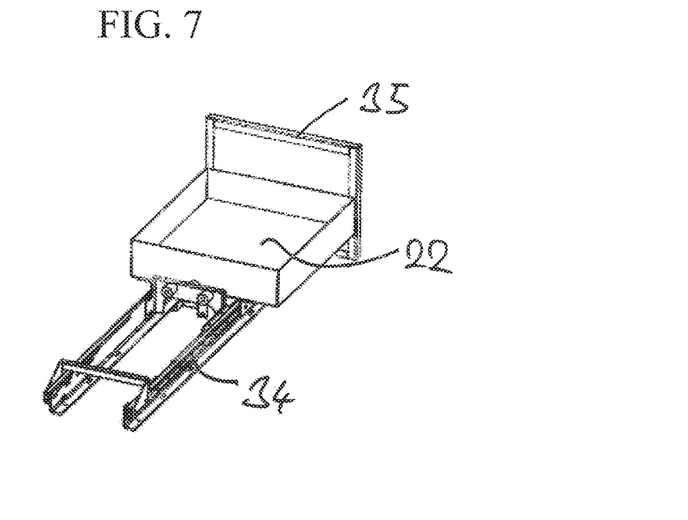
FIG. 7 shows an embodiment of an expulsion station in accordance with the present disclosure such as is used in the embodiment of a buffering station shown in FIG. 4.

An embodiment of the buffering station in accordance with the present disclosure is shown in FIG. 4; components of this buffering station are shown in FIGS. 5, 6, and 7. The buffering station implements a plurality of aspects of the present disclosure in combination.

In accordance with an aspect, the buffering station as a transport device has a turntable 30 having a plurality of placement areas 20. The placement areas are respectively moved from the placement region via the detection region to the removal region by rotating the turntable. A workpiece placed on a placement area in the placement region is therefore first moved to the second object recognition device 21, is detected there, and is removed by the second picker 4 after a further rotation of the turntable in the removal region.

If a first placement area of the turntable is located in the placement region, a second placement area is simultaneously located in the detection region and a third placement area is located in the removal region. The apparatus works in a cycled manner so that with a respectively stationary turntable, a first workpiece is placed in the placement region, a second workpiece is simultaneously detected in the detection region and a third workpiece is simultaneously removed in the removal region. The turntable is then rotated so that the respective workpieces move into the respective next region, whereupon corresponding worksteps are again carried out in all three regions simultaneously.

In the embodiment, three placement areas 20 are provided that are arranged at an angular interval of 120 degrees at the turntable 30. The turntable is rotated by 120 degrees after each work cycle.

In alternative embodiments of the present disclosure, the turntable could also have a larger number of placement areas or rotational positions. Further alternatively, the placement areas also do not have to be physically separated from one another, but could rather be configured as annular placement areas, for example.

In accordance with a further aspect of the present disclosure, the second object recognition device 21 has an enclosure 31 that reaches from a sensor arranged in the upper region of the enclosure down to the transport device. The second object recognition device furthermore has a light source for illuminating the workpieces. A uniform illumination of the workpieces independent of ambient light is possible in the detection region by the enclosure 31 and the separate light source. A 2D sensor may be used as the sensor, for example a camera sensor.

The enclosure 31 in the embodiment is designed as a housing only open toward the transport device. Each of the placement areas 20 can be moved beneath the enclosure 31 by rotation of the turntable. The total base surface of a placement area 20 may be located beneath the enclosure 31 once it has been rotated into the detection region.

At least in a supply and discharge region, the edges of the enclosure 31 do not completely reach up to the plane of the placement areas 20 to enable the supply of workpieces arranged on the placement areas 20. If the placement areas 20, as shown in the embodiment, however, have upwardly projecting marginal regions 29, they can substantially reach up to the lower edge of the enclosure 31. The sensor within the enclosure is in contrast substantially further away from the placement area 20 than the lower edges of the enclosure. The spacing between the sensor and the placement area can in particular be at least twice as large and optionally at least 5 times as large as the spacing between the lower edge of the enclosure in the region of the supply and discharge region and the placement area 20.

In accordance with a further aspect of the present disclosure, the buffering station has tiltable placement areas.

In the embodiment, the placement areas 20 of the turntable are configured as tiltable placement areas. A tilting of the placement areas 20 can be used to expel workpieces.

The expulsion can take place in that a placement area 20 of the turntable located in the detection region is tilted. The enclosure 31 may be configured such that it permits a tilting of the placement area 20 in its interior. The lower edge of the enclosure 31 may be arranged outside a base surface of the placement area 20 located in the detection region so that said placement area can tilt into the enclosure.

Starting from the placement area 20, the workpieces slide into an expulsion apparatus 21 by which the workpieces can be manually removed from the apparatus.

In the embodiment, a table 27 is furthermore provided that has a tiltable placement area 19. It is arranged next to the transport device. In the embodiment, it is located between the bin and the turntable.

The controller is configured such that the first picker only places a picked workpiece on the tiltable placement area 19 when an incorrect number of workpieces is picked, in particular when more than one workpiece has been picked. This can in particular take place when another workpiece has caught the picked workpiece such that it is also lifted up by the first picker. This can be detected by a light barrier, for example, that detects the spacing of the first picker from the light barrier at which a workpiece breaks through the light barrier. If this spacing does not correspond to the spacing that would be expected on the picking of only one workpiece, the controller assumes a picking of a plurality of workpieces and places them on the placement area 19. If only one workpiece is picked, it is placed directly onto a placement area 20 of the transport device.

If workpieces are placed on the placement area 19, it is brought into a slanted position by tilting and thus forms a slide from which the workpieces slide onto a placement area of the transport device of the buffering station; in the embodiment, onto a placement area 20 of the turntable that is located in the placement region.

The workpieces that slid onto the placement area are brought into the detection region by a subsequent movement of the transport device, by rotation of the turntable in the embodiment, and it is detected in said detection region by means of the second object recognition unit whether actually too many workpieces are disposed on the placement area 20 of the turntable. If the second object recognition device 21 confirms that too many workpieces are disposed on the placement area 20, they are expelled by means of a tilting of the placement area 20.

The mechanical design of the table 27 is shown in more detail in FIG. 5. It has a pedestal on which the placement area 19 is arranged tiltable about a horizontal axis of rotation 32. A pneumatic cylinder 28 arranged between the pedestal and the placement area 19 is used for the tilting.

The more detailed configuration of the tiltable placement areas 20 arranged at the turntable 30 is shown in more detail in FIG. 6. They are respectively arranged via a horizontal axis of rotation 32 at the turntable 30, with the tilting taking place via pneumatic cylinders that cannot be recognized.

Different drives, in particular different linear drives, could naturally also be used as the drive for tilting.

The tiltable placement areas 19 and 20 each have a planar placement area and an open edge 33 which is located at the bottom in the tilted state and over which the workpieces slide from the placement area. In the remaining marginal regions, the placement areas in contrast have upwardly projecting margins 29 that prevent workpieces from accidentally sliding from the placement areas in these regions.

The embodiment of the expulsion apparatus is shown in more detail in FIG. 7. It is a drawer 22 in this embodiment that is arranged beneath the turntable such that the workpieces that are located on a tiltable placement area 20 that is located in the detection region slide into the drawer 22 by tilting said placement area. The drawer 22 can be moved over rails 34 and is accessible from the outside of the protective enclosure 9 of the apparatus.

The front 35 of the drawer 22 forms a part of the protective enclosure 9 of the apparatus for this purpose. As can be recognized in FIG. 2, the drawer 22 can hereby be operated from outside the protective enclosure of the apparatus to manually remove expelled workpieces.

The buffering station has the protective arrangement 55 shown in FIG. 4 that separates the region of the drawer from the working region of the first picker and therefore enables a removal of the workpieces from the drawer without interruption of the work of the apparatus.

In accordance with a further aspect of the present disclosure which can be seen from FIGS. 1 to 3, the second robot arm 8 which is used for placing the workpieces on the transport device 6 is arranged on a pedestal 13 beneath which the transport device 6 extends.

The transport device has a placement region 19 that extends from the region of the pedestal next to the pedestal. The placement region 19 of the transport device 6 is therefore easily accessible for the second picker 4 or for the second robot arm 8.

As can in particular be recognized from FIG. 2, a handling station 16 is provided beneath the pedestal 13 and can be used for a manual handling of the workpiece on the transport device. An extremely space-saving design can be produced, on the one hand, from the arrangement of the second robot arm 8 on the pedestal 13. On the other hand, the station 16 is largely separated from the working region of the robot arm 8 or of the second picker by the pedestal 13.

The pedestal 13 in the embodiments has a plurality of supports 15 that in turn support a platform on which the second robot arm 8 is arranged. The transport path 16 that extends beneath the pedestal between the supports is accessible from the outside between two supports 15. The placement region 19 and the station 16 are additionally separated from one another beneath the plane of the pedestal via a strut 60 of the pedestal beneath which strut the transport device 6 travels.

A protective wall 70 that separates the working region of the second robot arm from the station is located above the station 16.

The second robot arm 8 has a base 23 that is arranged on the pedestal 13. A first element 24 of the robot arm is rotatably arranged on the base 23 via a vertical axis of rotation. The first element 24 has a horizontal pivot axis via which a first arm segment 25 is arranged at the first element. The robot arm 8 can be designed, for example, as a normal 6-axis industrial robot.

As can be recognized in FIG. 3, the first robot arm 7 can also have a design such as has just been described with regard to the second robot arm. In the embodiment, the base 23 of the first robot arm is likewise on a pedestal 26 which, however, is lower than the pedestal 23 on which the second robot arm 8 is arranged.

In the embodiment, the base 23 of the second robot arm 8 is arranged at the end of the pedestal 13 facing the placement region 19 and is therefore located above the region that separates the placement region 19 from the handling region 16 of the station.

Workpieces placed on the transport device 6 in the placement region are first traveled into the handling region or in the region of the station 16 and are traveled onward from there into a region 18 of the transport device located outside the apparatus.

As can be seen in FIG. 2, a processing station 17 can be arranged at the outlet of the apparatus and can be used, for example, to mark the workpieces, for example via a laser marking.

In the embodiment, the apparatus is adapted for a parallel handling of two different workpieces. For this purpose, the transport device 6 has two separate parallel transport paths having correspondingly different nests.

The apparatus in accordance with the present disclosure further has a second buffering station 5 that is configured as a repicking station. The workpieces have to be placed on the transport device 6 with a specific orientation, which in turn requires a specific alignment between the two pickers 4 and the workpieces. Such an orientation is only possible on the picking up of the workpieces from the first buffering station 3 when the workpieces have already been arranged with the correct orientation over a first placement area of the first buffering station. Such already correctly oriented workpieces are directly placed onto the transport device from the first buffering station.

Workpieces that are arranged on the first buffering station with an incorrect orientation are in contrast first placed on the second buffering station by the second picker 4 and are there picked again with a changed orientation between the workpiece and the picker in order then to be placed on the transport device 6 from the second buffering station.

The orientation of the workpieces on the buffering station is determined via the second object recognition device 1, with the controller controlling the second picker 4 on the basis of data of the second object recognition device 21 corresponding to the procedure presented above.

Figure 8A:
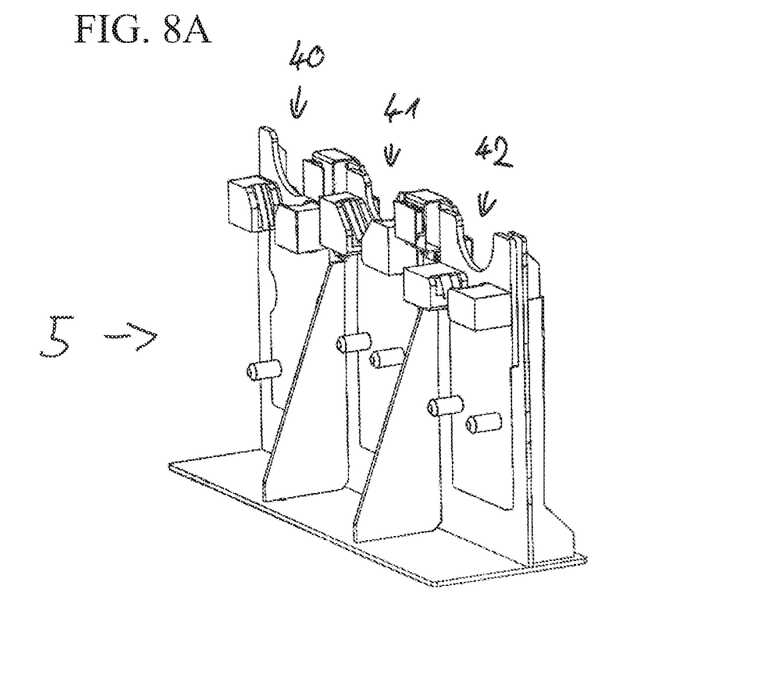
FIG. 8A shows a perspective view of a second buffering station.
Figure 8B:
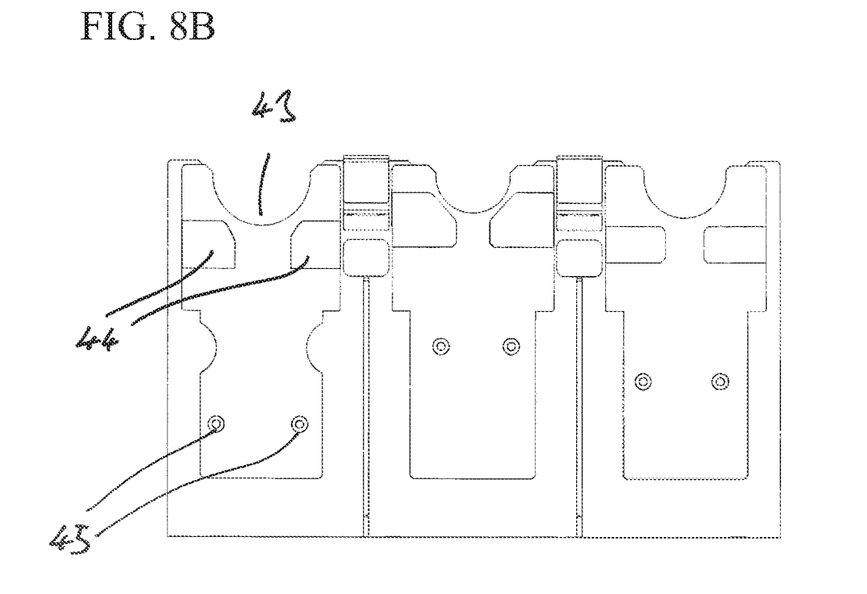
FIG. 8B shows a side view of a second buffering station.

An embodiment for a repicking station usable as a second buffering station is shown in FIGS. 8A and 8B, with three separate repicking locations 40, 41, and 42 for three different workpieces being present here. Since the workpieces to be handled here are con rods, blocks 44 are provided on which the con rod head comes to lie as well as pins 45 that limit the position of the con rod. An annular cut-out 43 is provided in the upper region so that a repeat picking from the other side through the con rod eye is possible. In other embodiments of the workpiece, differently designed repicking locations would naturally be used.

In the above-described embodiment, the second picker 4 or the second robot arm 8 was used to pick workpieces from a first buffering station. In alternative embodiments of the present disclosure, the second robot arm 8 could, however, also be used directly to pick workpieces from a bin and to place them on the transport device 6 and/or on the second buffering station. In this case, the first buffering station and/or the first picker could be dispensed with. The second picker may then be arranged at the second picker arm 8 via a picking arm element having one or more additional axes of movement, in particular via a picking arm element such as was described above with regard to the first picker.

The individual aspects of the present disclosure that were shown in more detail with respect to the embodiment can also in another respect be used, also per se in each case, and without the other aspects in accordance with the present disclosure.

The specific embodiments that were described with reference to the embodiment for the individual aspects can in particular also each be used independently of the remaining aspects and their embodiment.

The invention claimed is:
1. An apparatus for automated removal of workpieces arranged in a bin, comprising:

a first object recognition device for detecting the workpieces in the bin;

a first picker for picking and removing the workpieces from the bin;

a controller for evaluating data of the first object recognition device, for path planning and for controlling the first picker; and a transport device on which the workpieces removed from the bin are placed, a robot arm that is used for placing the workpieces on the transport device; and a pedestal positioned over the transport device and the robot arm arranged on the pedestal.

2. The apparatus in accordance with claim 1, wherein the transport device has a placement region that is arranged next to the pedestal on a first side, and the transport device extends from the placement region, beneath the pedestal, to a second side of the pedestal, and further out of the apparatus;

and a region of the transport device arranged beneath the pedestal forms a handling region.

3. The apparatus in accordance with claim 1, wherein the first picker is arranged at the robot arm; and wherein the robot arm is used both for picking the workpieces from the bin and for placing the workpieces on the transport device.

4. The apparatus in accordance with one of the claim 1, further comprising a second picker that is arranged at the robot arm, wherein the first picker is used for picking the workpieces from the bin and the second picker is used for placing the workpieces on the transport device.

5. The apparatus in accordance with claim 4, wherein the first picker is arranged at a further robot arm and/or at a surface portal.

6. The apparatus in accordance with claim 2, further comprising an intermediate station on which the first picker places the workpieces after the removal from the bin, wherein the robot arm is used to place the workpieces on the placement region of the transport device, starting from a buffering station.

7. The apparatus in accordance with claim 6, wherein the robot arm is used to pick up the workpieces placed by the first picker from the buffering station and to selectively place them on a second buffering station and on the transport device;

wherein a second object recognition device is provided that determines an orientation of a workpiece on the buffering station; and wherein the controller decides with reference to data of the second object recognition device whether a workpiece moves directly to the transport device or first to the second buffering station and/or wherein the second buffering station is a repicking position that permits a picking of the workpiece with a changed orientation relative to the picker.

8. The apparatus in accordance with claim 6, wherein the buffering station comprises a transport device that transports the workpieces from a placement region into a removal region; and/or wherein the buffering station has at least one tiltable placement area that is tiltable into a slanted position via a tilt mechanism, with the tiltable placement area being configured such that a workpiece placed on the tiltable placement area slides from the tiltable placement area due to the tilting.

9. The apparatus in accordance with claim 8, wherein the tiltable placement area is arranged such that a workpiece placed on the tiltable placement area slides onto the transport device by tilting the tiltable placement area; wherein the buffering station has a sensor that recognizes whether more than one workpiece has been picked; and wherein the controller controls the first picker when more than one picked workpiece was detected such that the workpieces are placed on the tiltable placement area and slide onto the transport device by tilting the placement area;

and/or wherein the tiltable placement area is arranged at the transport device;

wherein the transport device has a plurality of separately tiltable placement areas; wherein the tiltable placement area is arranged at a turntable; and wherein the turntable has a plurality of separately tiltable placement areas;

and/or wherein the buffering station has an expulsion apparatus that is arranged such that a workpiece placed on the tiltable placement area slides to the expulsion apparatus by tilting the tiltable placement area.

10. The apparatus in accordance with claim 1, further comprising a buffering station on which the first picker places the workpieces after the removal from the bin, wherein the buffering station comprises a transport device that transports the workpieces from a placement region into a removal region; and having a second object recognition device for detecting the workpieces on the transport device, wherein a second object detection device has a light source for illuminating the workpieces; wherein the second object recognition device has a housing that reduces an incidence of scattered light onto the workpieces from outside; wherein the housing extends from a sensor that is arranged at a first spacing from a placement area of the transport device toward the transport device; wherein a supply and discharge region between a casing and the placement area of the transport device remains open that permits supply and discharge of the workpieces on the transport device into a region of the casing; wherein the casing ends in the supply and discharge region at a second spacing from the placement area of the transport device; wherein the second spacing amounts to less than 50% of the first spacing.

11. The apparatus in accordance with claim 1, further comprising a buffering station on which the first picker places the workpieces after the removal from the bin, wherein the buffering station comprises a turntable that transports the workpieces from a placement region into a removal region; and having a second object recognition device for detecting the workpieces on the turntable; wherein the second object recognition device is arranged above the turntable such that a workpiece moves on the way from the placement region into the removal region into a detection region where it is detected by the second object recognition device before it is moved further to the removal region by rotation of the turntable;

wherein the turntable works in a cycled manner and has at least three rotational positions; wherein a placement area of the turntable is arranged in the placement region in a first rotational position of the turntable, in the detection region in a second rotational position, and in the removal region in a third rotational position; and wherein the placement of a workpiece on the turntable by the first picker, the detection of a workpiece on the turntable by the second object recognition device, and the picking back up again of a workpiece from the turntable by the picker arm respectively take place with a stationary turntable;

and/or wherein the turntable has at least three placement areas; wherein, whenever a first displacement area is arranged in the placement region, a second placement area is located in the detection region and a third placement area is located in the removal region;

and wherein a placing of a first workpiece on the turntable by the first picker, a detection of a second workpiece on the turntable by the second object recognition device, and a picking back up again of a third workpiece from the turntable by the picker arm take place.

12. The apparatus in accordance with claim 7, wherein the first object recognition device comprises a 3D sensor and the second object recognition device comprises a 2D sensor.

13. The apparatus in accordance with claim 8, wherein the transport device is a turntable.

14. The apparatus in accordance with claim 9, wherein the expulsion apparatus is a drawer, and wherein the drawer is operated from outside a protective enclosure of the apparatus.

15. The apparatus in accordance with claim 10, wherein the second spacing amounts to less than 20% of the first spacing.

16. The apparatus in accordance with claim 11, wherein the placing of the first workpiece on the turntable by the first picker, the detection of the second workpiece on the turntable by the second object recognition device, and the picking back up again of the third workpiece from the turntable by the picker arm take place simultaneously.

17. The apparatus in accordance with claim 2, wherein a plurality of bins with workpieces are arrangeable in a working region of the first picker from which the first picker can pick workpieces, with a supply arrangement having at least two supply regions arranged next to one another for bins being provided, with the first object recognition device being movable over each of the bins and/or supply regions by means of a travel arrangement, and/or with a separation apparatus being provided via which the supply regions are individually separated from the working region of the first picker, with a hood being provided that is moved over one of the bins and/or over one of the supply regions; and/or wherein a plurality of different workpieces are handled next to one another; and/or wherein the transport device has a plurality of parallel transport paths.

18. The apparatus in accordance with claim 2, wherein the handling region provided beneath the pedestal comprises a station for manual handling of the workpieces on the transport device.

19. The apparatus in accordance with claim 18, wherein the apparatus has a protective enclosure; wherein the station for manual handling of the workpieces is accessible from outside the protective enclosure during ongoing operation of the apparatus; and wherein the station for manual handling of the workpieces is open to the outside.

20. The apparatus in accordance with claim 18, wherein the station for manual handling of the workpieces is located outside the working region of all pickers of the apparatus and/or is separated from the working region of all the pickers of the apparatus by a protective wall.

\* \* \* \* \*